REMOTE SUPERVISORY RADIO SIGNALING SYSTEM

Original Filed April 12, 1941 8 Sheets-Sheet 1

WILLIAM S. HALSTEAD
INVENTOR

ATTORNEY

Dec. 11, 1951 W. S. HALSTEAD 2,577,751

REMOTE SUPERVISORY RADIO SIGNALING SYSTEM

Original Filed April 12, 1941 8 Sheets-Sheet 2

WILLIAM S. HALSTEAD
INVENTOR

ATTORNEY

REMOTE SUPERVISORY RADIO SIGNALING SYSTEM

Original Filed April 12, 1941 8 Sheets-Sheet 3

WILLIAM S. HALSTEAD
INVENTOR

BY

ATTORNEY.

REMOTE SUPERVISORY RADIO SIGNALING SYSTEM

Original Filed April 12, 1941 8 Sheets-Sheet 4

WILLIAM S. HALSTEAD
INVENTOR.

BY [signature]
ATTORNEY.

Dec. 11, 1951 W. S. HALSTEAD 2,577,751

REMOTE SUPERVISORY RADIO SIGNALING SYSTEM

Original Filed April 12, 1941 8 Sheets-Sheet 5

WILLIAM S. HALSTEAD
INVENTOR

ATTORNEY

REMOTE SUPERVISORY RADIO SIGNALING SYSTEM

Original Filed April 12, 1941 8 Sheets-Sheet 6

WILLIAM S. HALSTEAD
INVENTOR.

BY

ATTORNEY

REMOTE SUPERVISORY RADIO SIGNALING SYSTEM

Original Filed April 12, 1941 8 Sheets-Sheet 7

WILLIAM S. HALSTEAD
INVENTOR

ATTORNEY

WILLIAM S. HALSTEAD
INVENTOR
ATTORNEY

Patented Dec. 11, 1951

2,577,751

UNITED STATES PATENT OFFICE 2,577,751

REMOTE SUPERVISORY RADIO SIGNALING SYSTEM

William S. Halstead, Purchase, N. Y., assignor, by mesne assignments, to Farnsworth Research Corporation, a corporation of Indiana Original application April 12, 1941, Serial No. 388,338, now Patent No. 2,459,105, dated January 11, 1949. Divided and this application March 24, 1945, Serial No. 584,589

3 Claims. (Cl. 250—6)

This invention pertains to traffic signalling, and in particular relates to a traffic control and communications system of the general type as disclosed in the Halstead patent Reissue No. 21,818. This is a division of application for U. S. Letters Patent, Serial No. 388,338, filed April 12, 1941 and which issued as U. S. Patent No. 2,459,105 on January 11, 1949.

The system of the Halstead patent involves the use of electric carrier wave energy for communicating intelligence to traffic within predetermined signalling zones by means of speech signals and audio frequency control signals which serve to selectively actuate visual indicators, such as "stop," "go," or "caution" signal lights. The audio frequency control signals may also so be rendered audible, to serve as an aural check, by means of the same electro-acoustic apparatus that is employed for reproduction of the speech signals.

The present application incorporates certain of the principles disclosed in the original system and includes improvements and modifications for effecting two-way aural communications as well as protective visual and aural signalling, for the purpose of attaining positive, centralized control of traffic operations within a given signalling zone.

In applying the system of the Halstead patent to specific traffic signalling fields, an example of which may be that of classification yard signalling, certain modifications and improvements have been found to be desirable in order to more effectively adapt the original system to the conditions peculiar to the particular service. For example, it has been determined that two-way aural communications between a central point and operators of vehicles, such as locomotives, or motor trucks, within a terminal area is desirable, and that constant periodic transmission of a protective aural and visual checking signal at predetermined intervals is of particular value in preventing damage to equipment or operating personnel in the event of failure of the control station transmitter or vehicle receiving equipment. Also, it has been found desirable to provide an automatic control means, operable by wave energy transmitted from a remote transmitter, which may be on a vehicle, whereby the control station transmitter is locked-out of operation while signals are being received from the remote transmitter.

Although the system of the present invention is particularly applicable to signalling in large terminal areas, such as classification yards, the embodiment of the invention as described herein is illustrative only, and represents a specific example of the application of the system of the invention to freight classification service. This application, therefore, does not constitute a limitation since the flexibility of the system is such that it may be used in signalling zones along railway main lines, in various terminal areas, or in other vehicle communications and traffic signalling services.

The present embodiment of the invention embraces a coordinated aural-visual communications and signalling system constantly under supervisory control of automatic protective, or "checking," signal circuits. Carrier wave energy, modulated by voice and control signals, is transmitted from a control station to vehicles within a given signalling zone. Receiving equipment on all vehicles within the zone, may, if desired, be tuned to respond to carrier wave energy, of a predetermined zone frequency, which is transmitted from the control station. Thus, the operator of the control station may be the central coordinator of all movements of vehicles, such as locomotives, within the signalling zone. This zone, in the case of classification yard signalling, may extend from the transmitter in every direction throughout a yard area, or it may be localized along specific lanes of traffic by directional wave-energy transmitting systems as disclosed in the Halstead patent.

In order to more completely ensure efficient and safe operation of vehicles within the signalling area, automatically transmitted periodic "checking" signal indications are provided in both the control station and in vehicles. This permits continuous supervision of operation of control transmitter equipment and receiving units in all vehicles as will be described in further detail.

It is essential in any traffic signalling and communication system in which orders of any nature are periodically transmitted to moving vehicles to provide a means for the prevention of accidents which might result from failure of the transmission and reception equipment. Suppose, for example, that a control dispatcher has given aural "proceed" instructions to the engineer of a "pusher" locomotive located at the rear of a long freight train proceeding toward the "hump" of a classification yard. Under these conditions, particularly if wayside signals are obscured by a fog or storm, the engineer will continue to move the locomotive until another signal is received to caution him or to direct him to cease the movement. Should the control transmitter or locomotive receiving apparatus fail, the engineer would assume that he should continue to move even though, in the meantime, the control operator has issued instructions to stop. It is obvious that the dispatcher's instructions would be ineffective in bringing the locomotive to a stop, not being aware of failure of equipment. Under this condition a serious accident might result.

Thus, in order that the engineer may ascertain at all times that the central station transmitter and locomotive receiver are in proper working order, an over-all protective checking system of automatic type is incorporated in the novel control means of the present invention. This checking system operates, in a general sense, upon the closed circuit principle in that failure of any part of the signalling system will automatically be indicated.

The checking system comprises a continuously operative means for transmitting a periodic control signal of a particular form which may be received by the engineer to indicate that he is receiving signals from a central station.

In the illustrative embodiment of the invention described herein, the control station emits a carrier frequency, modulated by a particular audio frequency which is transmitted periodically to the engineer. This signal is preferably in the form of a periodic series of impulses which may be manifest in the engineer's cab by aural or visual means.

This periodic carrier signal modulated by voice signals or by a particular control frequency may be employed at the mobile receiver to energize a sound reproducer or to selectively energize a particular checking or "proceed" indicator lamp in order that the engineer may know that he is in contact with the control station and may proceed in safety with a given order. During the transmission of speech from the central station, it is desirable that the checking system cease to operate in order that an uninterrupted intelligible voice signal may be received. To effect this function, the present invention employs a selective control circuit which automatically dispenses with the checking or "proceed" signals when the central transmitter operating switch is closed.

When the engineer desires to acknowledge the receipt of a particular control signal, he may, by means of his transmitter, send back a signal to the control station. This may be accomplished by voice signalling from the mobile unit, or by the simple closure of the transmitting switch in accordance with a predetermined code, which, when received at the control station, will automatically cause the visual operation of a carrier-actuated signal light.

In order to prevent interference with reception of a voice signal from a locomotive transmitter by the periodic actuation of the central control transmitter, a novel, carrier-actuated "lock-out" circuit is employed to automatically preclude operation of the central station transmitting operation and to keep the central station receiver in its normally-on condition while a carrier signal is being received. This lock-out circuit also serves to prevent manual operation of the central transmitter as long as a carrier wave from a locomotive transmitter is being received. A visual indication of reception of a carrier wave from a locomotive transmitter is also provided for supervisory or acknowledgment purposes. Thus, by means of automatic controls and visual signal indicators, a coordinated signalling system of highly dependable nature is provided. The possibility of simultaneous operation of both central station and mobile transmitter is also removed.

It is an object of this invention to provide a novel traffic signalling system for transmitting speech and protective control signals to traffic within a signalling zone.

It is an additional object of this invention to provide a novel two-way traffic communicating system for transmission and reception of visual and aural control signals within a signalling zone.

It is a further object of this invention to provide means whereby a control signal from a first electric wave transmitter will lock-out and prevent operation of a second remote transmitter while said first transmitter is emitting its lock-out control signal.

It is another object of this invention to provide means whereby a periodic control signal is automatically emitted at predetermined intervals from a signal transmitter at one station to a cooperating receiver at a second remote station to serve as a checking, or supervisory, signal for indicating that said transmitter and said receiver are operative.

Another object of this invention is to provide a traffic communications and control system for coordinating the movements of vehicles in a traffic area which is effective to automatically indicate failures in the transmission and reception system.

Another object of the invention is to provide for a comprehensive traffic control system for a railroad freight classification yard or similar terminal area wherein each of the locomotives or other vehicles is adapted to receive and transmit control signals, each relating to a particular freight yard operation.

For a better understanding of the invention, together with other and further objects thereof, reference is made to the following description, taken in connection with the accompanying drawings and its scope will be pointed out in the appended claims.

Referring to the drawings.

Figure 1:
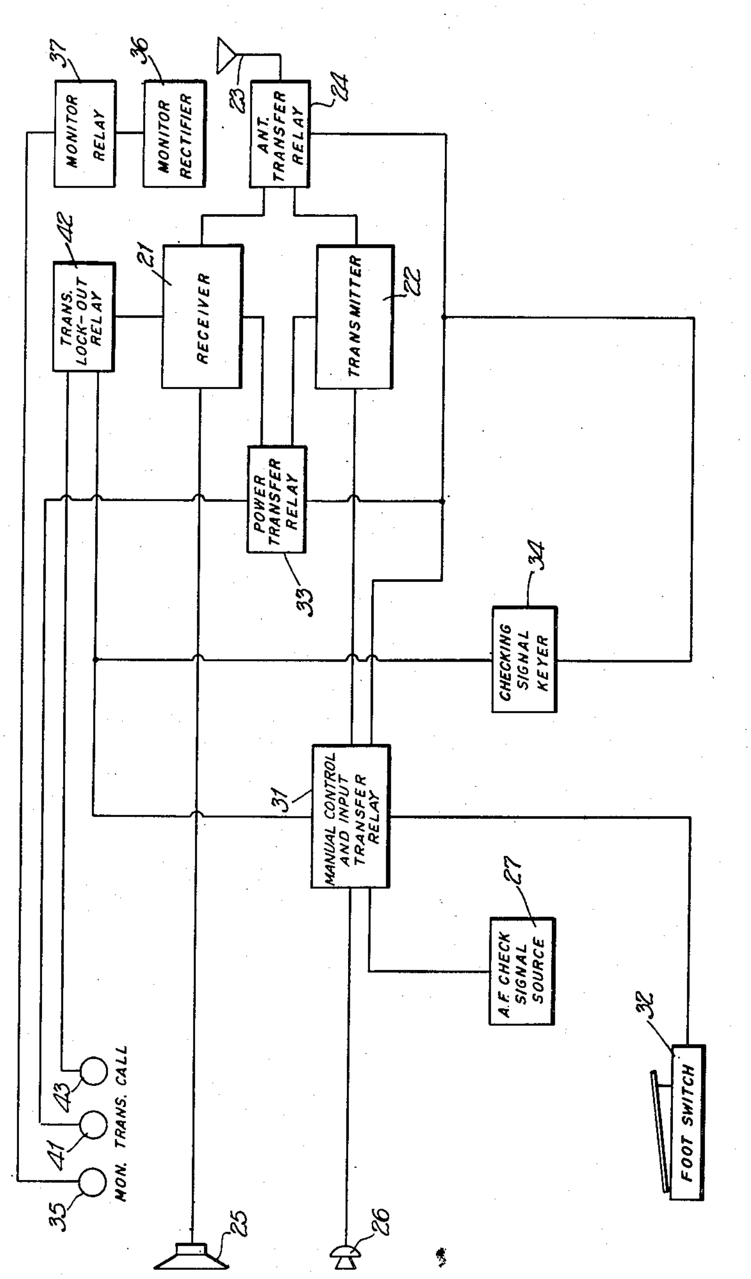
Figure 1 is a block diagram of the transmitting and receiving equipment employed at a central control station disposed adjacent a traffic signalling zone.

Referring now more particularly to Figure 1, there is shown a schematic representation of the central control station transmitter and receiver. This figure is merely a diagrammatic representation of the more detailed circuit diagrams shown in Figures 3 and 4 and the following description of the component parts will correspond for all of these figures.

The central control station may be located in the most accessible point of the limited area over which coordinating signals are to be transmitted. Thus, if the system to be described is applied to a freight classification yard, the central station may be disposed most conveniently adjacent the hump. The transmitter and receiver at the hump may be remotely controlled from one or more points if desired.

Figure 2:
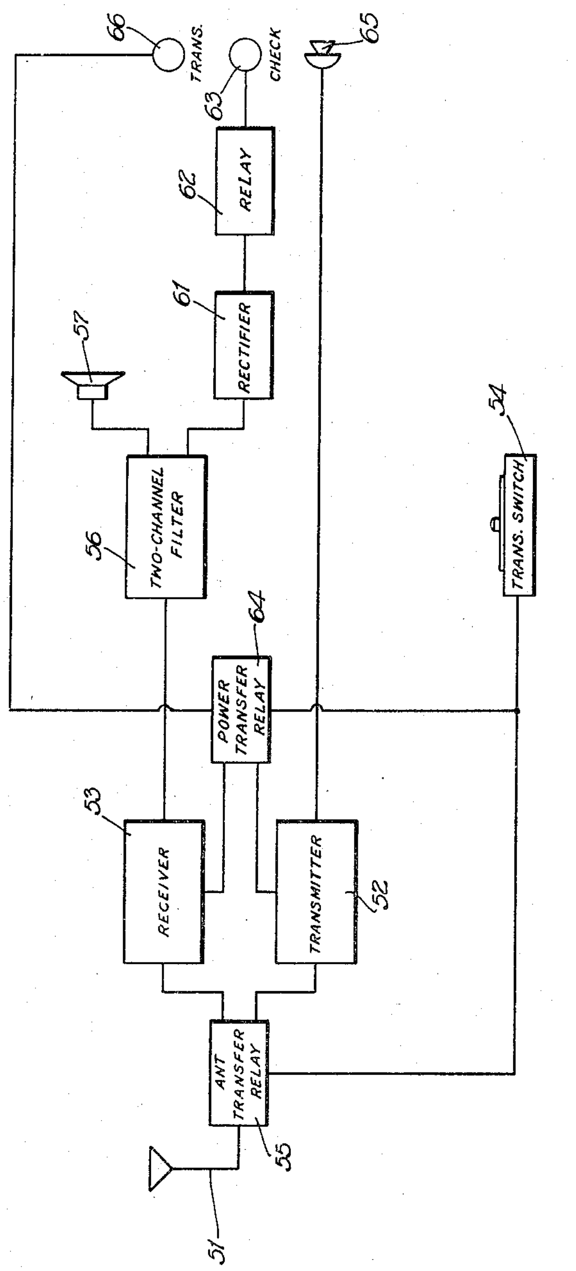
Figure 2 is a block diagram of transmitting and receiving equipment employed in a locomotive or other vehicle operating within the signalling zone of the central control station.
Figure 7:
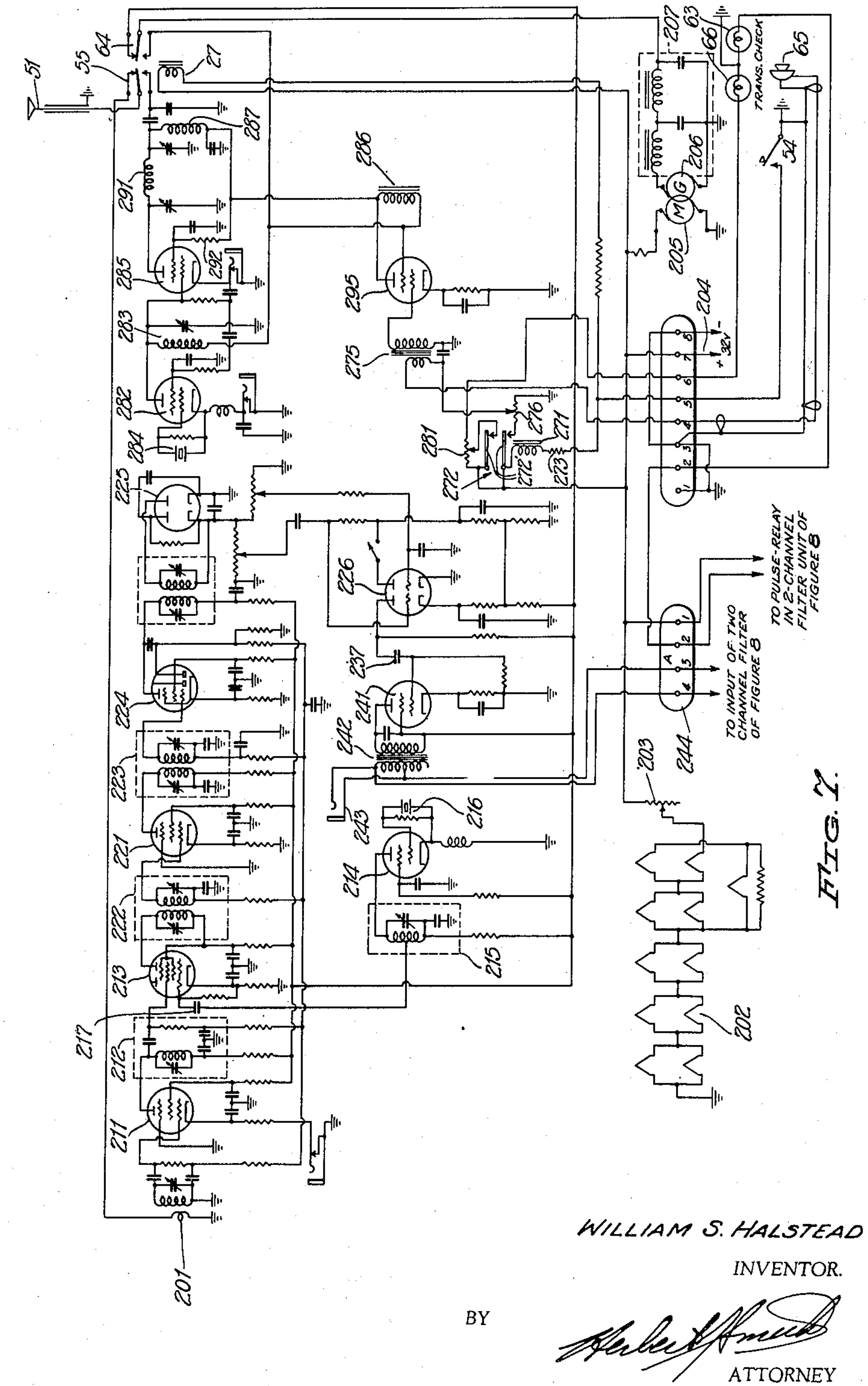
Figure 7 is a circuit diagram of a present-employed transmitter and receiver installed on a locomotive within the signalling zone of the central control station.
Figures 8, 9, 10, 11:
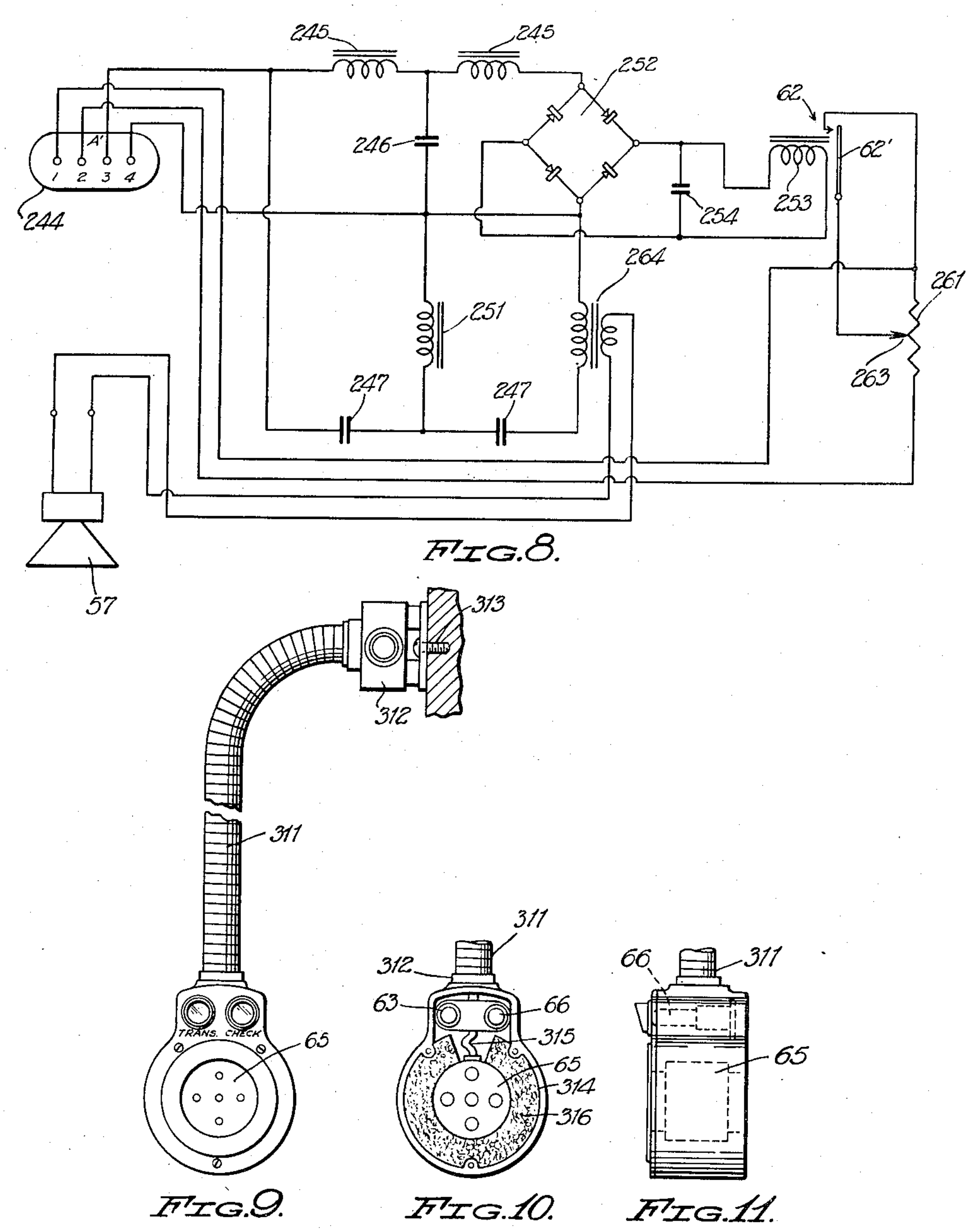
Figure 8 is a circuit diagram of a two-channel audio-frequency filter and checking-signal control relay and loudspeaker circuit employed in the present embodiment of the invention.
Figure 9 is a front elevational view of a present-preferred arrangement of a microphone, signal lights, and flexible supporting arm employed in the locomotive.
Figure 10 is a front elevational view of the microphone and signal light unit of Figure 9 with the front cover removed.
Figure 11 is a side elevational view of the microphone and signal light arrangement, showing the disposition of a shock-mounted microphone and signal lights within a housing such as illustrated in Figure 9.

From these control points, the hump conductor, yard master or other control station operator may be in a position to best determine the nature of the signal to be transmitted to locomotives equipped with coacting signalling apparatus, which may be of the form diagrammatically illustrated in Figure 2 and more particularly in the circuit diagrams of Figures 7 and 8.

Essentially, the central station includes a combined transmitter and receiver for establishing two-way voice communciations and automatic protective signalling with locomotives or other vehicles operating within a given signalling zone, such as the classification yard area.

As is illustrated in the embodiment of the invention shown in Figure 1, a receiver 21 and a transmitter 22 utilize a single antenna 23 which is joined to the transmitter or receiver through an antenna transfer relay 24. The receiver 21 may comprise conventional equipment for demodulating and amplifying a modulated signal radiated from the antenna 51 which is energized by a transmitter 52 (Figure 2) disposed upon a locomotive or a similar vehicle. The signal radiated from antenna 51 is intercepted by antenna 23 at the central station and applied to the receiver 21 (Figure 1) which in turn applies the demodulated signal energy to a loudspeaker 25 for rendering the received signals audible.

The transmitter 22 at the control station may also comprise conventional equipment for amplifying electrical signals impressed upon the input circuits thereof and causing these signals to modulate a radio frequency carrier which is then radiated into space through antenna 23 for reception by antenna 51 of Figure 2 and its coacting receiver 53 disposed upon a movable vehicle.

The signals applied to the input of transmitter 22 may comprise voice currents generated in microphone 26 or a constant-amplitude audio frequency control signal generated at source 27 for utilization by protective checking apparatus at the central station illustrated in Figure 1 and corresponding apparatus at the movable station indicated in Figure 2 for constantly providing periodic indication of the proper operation of all these circuits.

This audio frequency control signal is coupled to the transmitter through a transfer relay 31 which is manually controllable by a suitable switch such as the foot switch 32. Under normal conditions, the transfer relay 31 is in a position where the audio frequency energy from signal source 27 may be applied to the input of the transmitter 22. The antenna transfer relay 24 is normally in a position for applying the signals intercepted by antenna 23 to the receiver 21.

The receiver 21 and transmitter 22 are energized from any available power source which may comprise batteries or alternating current. The filaments of the various vacuum tubes utilized in these circuits are continuously energized whereas the plate circuits of the transmitter and receiver are selectively energized from a high voltage source connected with either the transmitter or the receiver through the power transfer relay 33.

The movable members of the power transfer relay operate simultaneously with the movable members of the antenna transfer relay 24. Thus when the antenna 23 is coupled to the receiver 21, the power transfer relay applies the high voltage to the plates of the receiving tubes. Conversely, when the antenna transfer relay interconnects the antenna 23 and the transmitter 22, the power transfer relay serves to permit the energization of the transmitter vacuum tubes and to deenergize the plate circuits of the receiver 21.

An automatic keying device 34 is continuously operated and under normal operating conditions determines the movement of the power transfer relay 33 and the antenna transfer relay 24, and effects periodic operation of the relays. The keying device 34 is employed to apply an energizing voltage to power transfer relay 23 and to antenna transfer relay 24 at regular intervals.

When this energizing voltage is applied to the relays, a signal is radiated which is a radio frequency carrier modulated by the constant-amplitude audio frequency control signal provided by the control signal source 27. This energizing voltage is of relatively short duration and thus the radiated checking signal is in the form of a plurality of periodic modulated impulses.

During the normal non-keying portion of the operating cycle of the keying device 34, the power transfer relay 33 and the antenna transfer relay 24, are in the normal position, which as previously mentioned, permits receiver 21 to remain in a normally-on condition to accept incoming signals from a transmitter of the type indicated in Figure 2, and to impress them upon loud speaker 25.

Accordingly, the central station during its operation transmits a series of periodic impulses and is in a position for receiving signals in the intervening time. If the operator of the central control station desires to transmit instructions to the vehicle carrying the apparatus illustrated in Figure 2, operating within the localized areas such as the freight classification yard, the switch 32 is depressed which in turn causes the operation of transfer relay 31.

As previously described, the transfer relay, 31, when energized disconnects the modulating control signal source 27 from the input circuit of the transmitter and couples the microphone thereto. In addition, the operation of transfer relay 31 energizes power transfer relay 33 and antenna transfer relay 24 to apply voltage to the transmitter plate circuits, and to couple the antenna 23 to the transmitter output circuits.

Thus, it may be seen that speech signals applied to the microphone 26 will be caused to modulate the output circuits of transmitter 22 and a modulated signal will be radiated from antenna 23. The central station circuits will be in a condition for transmitting speech signals as long as the switch 32 is closed.

When the desired instructions have been given by the control operator, the release of switch 32 will then automatically disconnect the microphone and apply the control signal generated within source 27 to the input circuits of the transmitter and the keying device 34 will again resume control of the sequential application of power to the plate circuits of the receiver and transmitter and the corresponding application of the antenna 23.

The central control station is provided with a plurality of pilot lights which indicate proper operation of the entire two-way communication system. These pilot lights are disposed in the operator's field of vision to facilitate checking operations. A pilot light 35 is provided to indicate the fact that a modulated carrier is being radiated from antenna 23 during the operation of the transmitter. This is accomplished by a circuit which is inductively coupled to the transmitter antenna circuit.

As will be hereinafter explained, the signal induced in this circuit is applied to a demodulating and audio-frequency signal rectifying circuit 36 which causes the operation of a relay 37 when a modulated signal is being radiated. The relay 37 in turn energizes the transmitting monitor signal light 35. It is evident that during the normal operating cycle, the monitor light 35 will be energized periodically by the modulated carrier which is caused to be periodically transmitted by the keyer 34.

An additional visual indication for the operator of the central station is a transmitting indicator light 41 which is energized whenever the power transfer relay energizes the plate circuits of the transmitter 22. Accordingly, during the normal operation of the control station, the monitor indicating light 35 and the transmitting pilot light 41 will be energized in unison.

On the other hand, when the foot-switch 32 is operated for the transmission of speech, the transmitting indicating light 41 will be continuously energized to indicate the application of power whereas the monitor light 35 will flash in accordance with the impressed signal voltage during speech transmission or other modulation.

When antenna 23 is energized by signals from a vehicle operating within the classification yard or other such area, the receiver 21 operates to demodulate these signals and impress the demodulated energy upon loud speaker 25.

To prevent interference with an incoming signal from a locomotive transmitter by the automatic or manual operation of the central transmitter, a novel carrier-operated transmitter lock-out control circuit is provided which automatically causes the periodic keying circuit 34 and input-transfer relay 31 to lose control over the operation of the power transfer relay 23 and the antenna transfer relay 24. This "lock-out" condition will exist as long as a carrier-wave from a locomotive transmitter is being received at the central station.

To effect this control function a carrier-controlled lockout relay 42 is provided in the audio amplifying and noise suppression circuit of the receiver 21 and operates whenever a carrier is received by antenna 23 from a transmitter such as 52 indicated in Figure 2. This relay when energized automatically disconnects the keying device 34 and transfer relay 31 and thus permits the continuous reception of energy by receiver 21. In order to provide an indication that the carrier wave is being received, the lock-out relay 42 also serves to energize an indicating light 43 which again is preferably disposed in the operator's normal field of vision.

It is evident that this novel system provides means whereby signals from a vehicle may be received aurally through the agency of loud speaker 25 or visually by pilot light 43. Thus, since the lock-out relay is operated by an incoming carrier wave transmitted from the vehicle transmitter 52 illustrated in Figure 2, the operator of the vehicle may, by momentarily keying his transmitter 52 through the agency of a switch 54, transmit an intermittent carrier which will energize pilot light 43 in accordance with any predetermined signalling code of simple form. Thus the engineer may acknowledge receipt of an instruction, or convey other signal intelligence if it is not convenient for him to speak into his microphone.

Therefore, it may be seen that if the central station is arranged with the various circuit elements diagrammatically illustrated in Figure 1, it will continuously and automatically transmit a series of checking or control impulses and be in a position to receive signals in the time between impulses.

Furthermore, the central station operator may transmit any desired speech signals and may receive incoming signals aurally or visually. Thus the central station is equipped for two-way communication with a remotely disposed station such as that indicated in Figure 2. If this equipment is applied to a railroad freight classification yard, then the radio apparatus of Figure 2 may be most conveniently located within the cab of a locomotive or upon the tender thereof. Essentially, the mobile equipment comprises the transmitter 52 and receiver 53, each cooperable with the single antenna 51 through a relay 55 which selectively connects the antenna and the receiver or transmitter.

Normally, the transfer relay 55 is in a position where antenna 51 is coupled to receiver 53 so that signals radiated from antenna 23 at the control station will be applied to the receiving equipment at the locomotive. The received signals after being demodulated in receiver circuits 53 are applied to a two-channel filter 56 which may, as will hereinafter be pointed out, comprise a parallel combination of high and low pass electric wave filters.

The filter 56 selectively applies received speech signals to a loud speaker 57 for rendering such speech audible to the locomotive engineer. Furthermore, this filter 56 separates speech signals from the received periodic checking signals of predetermined audio frequency which are radiated by antenna 23 at the control station when the control station is operating periodically under influence of the automatic keying device.

Thus one channel of filter 56 is tuned to separate the audio frequency control signal energy from voice signals and to selectively apply this control signal energy to a rectifier 61 which in turn energizes relay 62 to produce a visual indication through the agency of a checking light 63.

Therefore this checking light will flash in accordance with the received audio frequency impulse in a manner similar to the monitor pilot light 35 at the control station. Accordingly, the checking light 63 disposed preferably within the field of vision will provide a visual indication by its flash that the central control station illustrated in Figure 1 and the locomotive receiving apparatus are in proper working order.

As a further assurance of this fact, a portion of the checking signal energy may be allowed to pass through the filter 56 to the loud speaker 57 to render the checking signal audible as a tone of characteristic pitch and thus provide a combination of periodic visual and audible signals within the locomotive for indicating proper operation of the equipment.

As has previously been described in connection with Figure 1, when the central station operator desires to transmit speech signals and depresses foot switch 32 the checking signals will cease for the duration of the speech transmission. Thus the checking signal will not interfere with the received speech transmissions. These speech transmissions will automatically be applied through the two-channel filter without appreciable attenuation to the loud speaker whenever they are transmitted from the control station.

The transmitter 52 when operated, ensures positive coordination between the control station operator and the locomotive engineer. Thus, the transmitter 52 permits the engineer of the locomotive to acknowledge the receipt of any specific instruction or to question any order and to ask for instructions whenever in doubt. The transmitter 52 also permits an engineer of one locomotive to communicate with an engineer of another radio-equipped locomotive in the same signalling zone.

The transmitter 52 is operable when the engineer's transmitting switch 54 is actuated. Thus the actuation of switch 54 automatically energizes antenna transfer relay 55 to couple the antenna 51 to the output of the transmitter circuits 52.

In addition, the actuation of switch 54 will energize a power transfer relay 64 which operates in a manner similar to that of power transfer relay 33 which is disposed at the central control station.

Accordingly, when the transmitter switch 54 is actuated, the power transfer relay 64 disconnects the power source at the locomotive from the receiver and connects the transmitter to this source. Hence the locomotive engineer may by speaking into microphone 65 call the operator of the central station at any time.

If, as previously mentioned, the locomotive engineer prefers to transmit a series of intermittent signals corresponding with a predetermined signalling code, he may by intermittently actuating the transmitting switch 54 key the transmitter to transmit a plurality of signals which will be made evident at the control station by the intermittent flashing of lamp 43. The power transfer relay serves in addition to transfer the energy from the receiver circuit to the transmitting circuit to energize a transmitting pilot lamp 66 to provide visual indication for the engineer that his transmitter is in operation.

Figure 12:
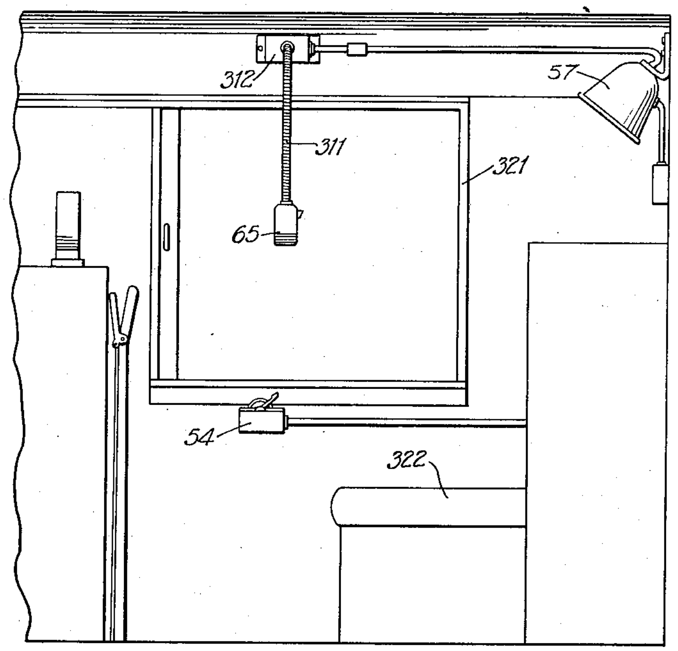
Figure 12 illustrates a present-preferred disposition of voice and protective signalling equipment of the system within a locomotive cab.

This transmitter pilot light may also be disposed in the engineer's field of vision. As shown in one modification, the transmitting pilot 66 and the checking indicating light may be disposed upon the engineer's microphone 65 which in turn is always disposed in his field of vision as will be described in connection with Figure 12.

Thus, from the block-diagram representation of a control station and a coacting transmitting and receiving unit which may be disposed upon a movable vehicle it may be seen that two-way voice communication may be established therebetween and that the operators of each station at all times have the additional protection afforded by the positive, selective action of visual indicators to show that the system is in proper working order.

To supplement the visual checking signal, the locomotive operator, as pointed out, also has an aural indication of reception of the checking signal. In the event of failure of any portion of the central station or mobile equipment, such failure will be visibly indicated at the central station and also on the locomotive through lack of visual or aural indication by the periodic checking signal.

Under these circumstances, the locomotive engineer and/or the control station operator will immediately investigate and will immediately cease all operations dependent upon the signalling system until the fault has been corrected.

An embodiment of the traffic communication system schematically illustrated in Figures 1 and 2, particularly for adaptation to a classification yard or similar localized traffic area is more completely illustrated in Figures 3 through 12, and reference is now made thereto.

Figure 3:
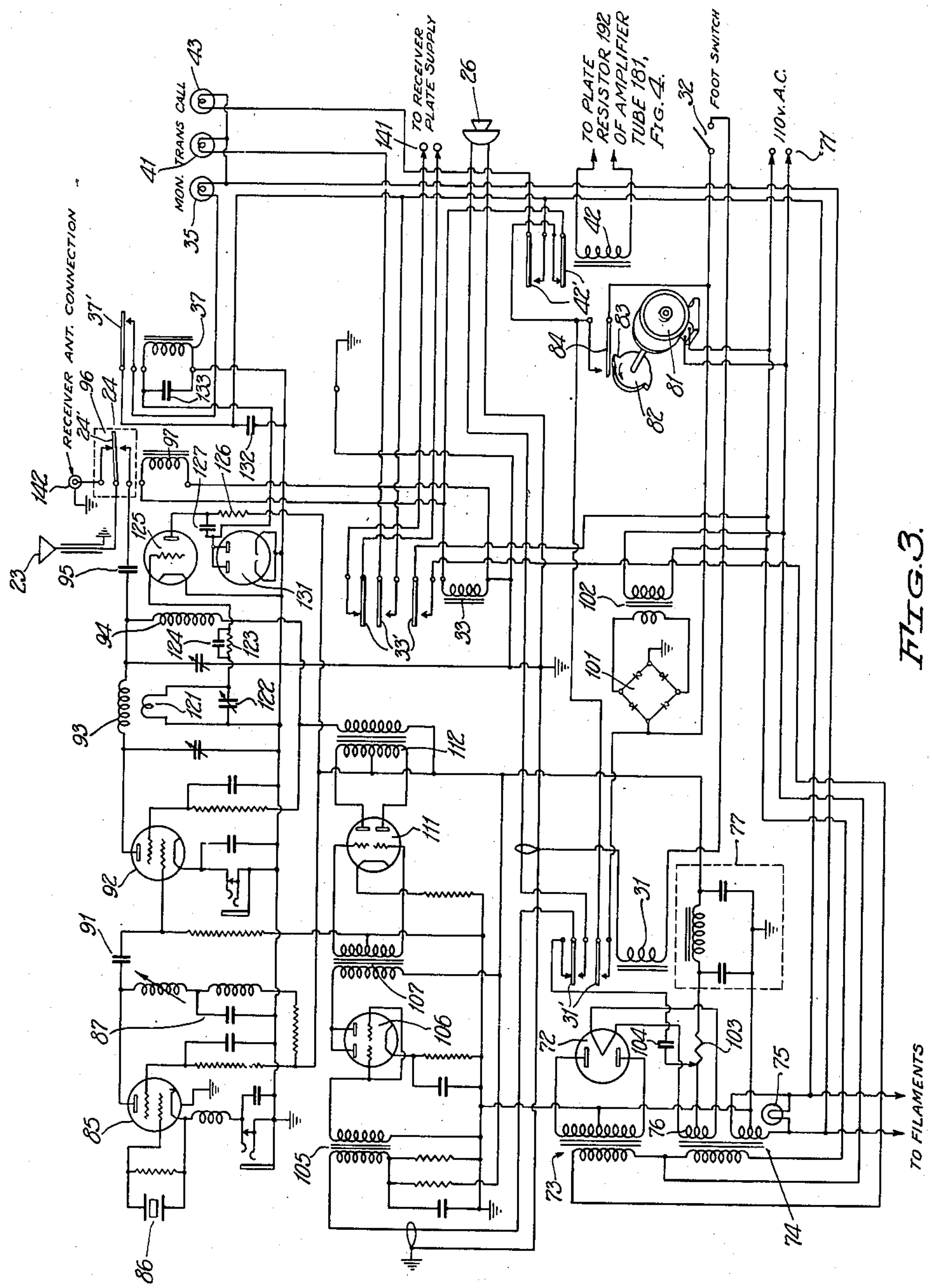
Figure 3 is a circuit diagram of transmitting equipment employed at the central control station.

In Figure 3, there is shown a circuit diagram of one section of the control station schematically illustrated in Figure 1. The transmitter, as indicated, is energized from an alternating current supply impressed upon the terminals 71. This alternating current is then rectified and applied to the transmitting circuits.

However, it is pointed out that any available power supply may be utilized and may be converted to the desired voltages in a manner which is well known in the art. The alternating current impressed upon terminals 71 is impressed upon a rectifier 72 through a power transformer 73, the high voltage secondary of which is joined to the anodes of the rectifier 72 in conventional manner.

A filament transformer 74 energizes the filament circuits of the various vacuum tubes and a pilot light 75 affords a visual indication of the application of this voltage.

Another secondary winding 76 is utilized to energize the heater of rectifier 72. The center tap thereof is the positive terminal of the direct current supply for the anodes of the transmitter. A filter 77 is employed to eliminate any ripple in the direct current supply. The alternating current impressed upon terminals 71 in addition serves to continuously drive a relatively small synchronous or other substantially constant-speed motor 81 which in turn drives a cam 82.

This cam, having a plurality of projections 83, operates to periodically close the switch 84 to permit the automatic keying of the transmitter as will be described in further detail. Essentially the transmitter comprises a radio frequency oscillator tube 85 having a tank circuit 87, the frequency of which is controlled by the crystal 86 in the grid circuit thereof.

The constant frequency output of the oscillator 85 is applied to the control grid of a power amplifier 92. The anode of this amplifier is energized from the high direct voltage source through a tank coil 93 and through a radio frequency choke coil 94.

The output of the power amplifier is in turn coupled to the antenna 23 through coupling condenser 95 and through antenna transfer relay 96. When the transmitter of Figure 3 is in the normal operating condition as illustrated, the closure of switch 84 under the influence of cam 82 will, as illustrated, energize the coil 97 of the antenna transfer relay 96 to couple the antenna 23 to the output circuit of the amplifier 92, and so permit the radiation of the signal generated at the transmitter.

Energization of the relay coils is secured through a small rectifying unit 101 which is preferably of the dry-disc type energized through transformer 102 from the main alternating current supply.

As illustrated, an audio frequency control signal is impressed upon the input circuit of the transmitter. This signal, which functions as the checking signal described in connection with Figures 1 and 2, is preferably of a relatively low frequency alternating current and is thus most conveniently obtained by utilizing a harmonic of the alternating current power supply.

Thus, as shown in Figure 3, the audio frequency control signal is obtained from the input to the filter 77. A tap on variable resistor 103 is coupled through condenser 104 and through the switch members of the input transfer relay 31 to the primary of the input transformer 105. The secondary of the transmitter input transformer 105 is coupled to the grid of a tube 106, the anodes of which are energized from the high voltage source through the primary of a coupling transformer 107.

The terminals of the secondary of transformer 107 are coupled to the grids of a push-pull modulator tube 111. The anodes of the tube 111 are joined to the terminals of the primary of a modulation transformer 112, the center tap of which is energized from the high voltage source.

In the modulating circuit, as indicated in Figure 3, the anode of the power amplifier 92 is coupled to the screen grid thereof through the tank coil 93 and the radio frequency choke 94. This parallel combination of screen grid and anode are then joined to the high voltage source through the secondary of transformer 112. Thus the signals impressed upon the input transformer 105 cause corresponding fluctuations in the plate and screen grid circuits of the power amplifier 92. The modulated carrier, as previously described, is coupled through condenser 95 to the antenna 23.

As hereinabove set forth, when relay 31 is in the normal position, the transmitter input amplifier 106 is in a condition to be energized by the audio frequency energy tapped from power-supply resistor 103 and passed through condenser 104, and the switching members of transfer relay 31. Thus, when power relay 33 is energized and power is applied to the transmitter, modulating signal energy is applied to the transmitter.

The audio frequency energy has a fundamental of twice the alternating current input frequency and thus may be of the order of 120 cycles if a commercial power line is used for a power supply at the terminals 71.

When the various relays are in their normal position as illustrated in Figure 3, it may be seen that the switching members of power transfer relay 33 preclude the flow of current in the primary of the plate transformer 73.

Accordingly, this precludes the energization of all the anode circuits of the transmitter since no voltage is impressed upon the anodes of the rectifier 72.

It is to be noted, however, that the transmitter is normally kept in a condition where the immediate energization thereof may be effected. Thus the primary of the filament transformer 74 is continuously energized from the power impressed upon terminals 71. The plate transformer 73 is dependent upon the position of the switching members of the power transfer relay 33 for energization.

During the rotation of motor 81, the cam projection 83 will close switch 84 and as may be seen from the circuit diagram, will thereby energize the coil of power transfer relay 33 from the voltage provided by the small full wave rectifier 101, provided, of course, that the coil of lock-out relay 42 remains deenergized and the switch contacts thereof remain in the position illustrated in Figure 3.

Energization of power transfer relay 33 will cause the switching members 33′ to move downward as viewed in Figure 3 and accordingly will energize the primary 73 of the plate transformer. This will simultaneously cause the application of a high direct-current potential to the anode of the various vacuum tube circuits illustrated and supply the low frequency signal to the primary of input transformer 105.

The coil 97 of the antenna transfer relay 24 is in parallel with the operating coil of power transfer relay 33 and consequently when the switch 84 is closed by the cam 82, the antenna transfer relay will operate to cause the arm 24′ to move downwardly as viewed in Figure 3 and connect the antenna 23 to the tank coil 93 through coupling condenser 95.

Therefore, the carrier modulated by a constant-amplitude audio frequency control signal is radiated into space when switch 84 is closed. Since the filaments of the various electron tubes are normally heated in this power transfer system, the transmitter will operate instantaneously upon the closure of switch 84.

Continued rotation of the cam will open the contacts of switch 84 and deenergize the relays 33 and 24 which will then resume their normal positions indicated in Figure 3 and the transmission of a wave will cease. Since, as previously described, the motor 81 operates at a substantially constant speed, the closure of switch contacts 84 will be periodic and thus a periodic signal comprising a radio frequency carrier modulated by an audio frequency signal will automatically be transmitted.

The rate at which these periodic signals are transmitted is dependent upon the particular application. As mentioned in connection with the block diagrams of the central station and the mobile station, Figures 1 and 2 respectively, the periodic impulses of the type just described are utilized as a checking signal in order that the operators may have a positive indication that the system is in proper working order.

Since, however, it is desirable in this novel system to permit the operator of the mobile station to call and speak to the control station, these pulses are of relatively short duration and may normally be transmitted at regular intervals of primarily the order of five seconds apart.

Since the operation of the power transfer relay 33 is periodic in accordance with the operation of switch contacts 84, the application of power to the transmitting circuits periodically occurs for a relatively short time. Therefore, since the modulated carrier of the transmitter is only generated for relatively short intervals, considerable economies are effected and the consumption of electrical energy is greatly decreased.

As hereinabove described, the monitor pilot light 35 shown in Figures 1 and 3 provides a visual indication of the fact that a modulated carrier is being generated. Energy for the operation of the relay controlling the pilot light 35 is derived from inductive coupling with the tank circuit of the transmitter. As illustrated in Figure 3, a coil 121 is inductively coupled with the tank coil 93.

The coil 121 is tuned to the carrier frequency by the variable condenser 122 and the potential appearing across this tuned circuit is impressed through the parallel combination of grid leak 123 and condenser 124 upon the control grid of an electron tube 125 which functions in this instance as a grid-leak detector. The anode circuit of the tube 125 is joined to the source of high potential through load resistor 126 and the output of this tube is coupled through condenser 127 to the anodes of a signal rectifier 131.

The rectified modulating signal energy then flows through the coil of the monitor relay 37 to cause the operation of contacts 37' thereof. The contacts 37' are joined in series with the monitor light 35 and this series circuit is connected to a power source suitable for energizing the monitor light 35.

In the embodiment illustrated in Figure 3, the monitor light is of a relatively low voltage type and is energized from the filament supply obtained from transformer secondary 74. A condenser 132 is connected across the monitor light in order to prevent radio frequency energy, which may be present in the relay leads due to stray coupling, from being fed back into the input circuit by interconnecting cables.

Since the coil of relay 37 is energized by the rectified demodulated energy coupled from the tank circuit, the monitor pilot light will flash, whenever a modulated carrier is generated and a signal transmitted. The relay 37 will normally tend to follow the variations of the modulations which may, if desired, be smoothed as desired by a filter circuit to preclude chattering thereof. A condenser, 133, is placed across the winding of relay 37 to by-pass the alternating current component of the rectified audio frequency signal.

The transmitted pilot light 41 is energized through the switching members of the power transfer relay 33 from the filament supply of the transmitter. This light will therefore operate whenever plate power is applied to the transmitter circuits and thus during the normal operation of the central station will flash periodically in accordance with the closing of switch 84.

If the central station operator desires to transmit a message to the operator of a locomotive in the classification yard, the switch 32 is closed. This switch may be any conveniently disposed normally open switch and in the modification illustrated, it is a foot switch adjacent the transmitter.

Closure of this switch will apply energy from rectifier 101 to the coil of input transfer relay 31 and accordingly cause the switching members 31' thereof to move downwardly and, as indicated, to interrupt the control signal circuit from the tap on power-supply resistor 103 to the input transformer 105, and to complete the circuit from a microphone 26 to this input circuit.

In addition, the switching members of this relay complete a circuit from the high voltage point of rectifier 101 to the parallel coils of relays 33 and 97, provided relay 42 is not energized. These relay coils, when energized as previously described, will apply a high potential to the plate circuits of the various vacuum tubes at the transmitter and will connect the antenna 23 to the tank circuit of the transmitter. Thus, the transmitter is in a condition whereby speech energy impressed upon microphone 26 is amplified and caused to modulate the radio frequency carrier in power amplifier 92, the energy from which is then radiated into space through antenna 23.

Furthermore, the operation of relay 31 in disconnecting the source of constant amplitude audio frequency checking signal from the input circuit of the transmitter precludes interference between speech transmission and the checking impulses despite the continued operation of motor 81 and the continued closure of switch 84.

Therefore, the operator of the central control station may transmit a message by operating the switch 32 and speaking into microphone 26. Since the receiver at the mobile unit is normally in a position for the reception of energy, the operator of the central station may immediately establish communications with the operator of a mobile unit within the same signaling zone.

The receiver of the central station permits the reception of signals from the classification yard locomotive whenever the engineer thereof desires to call in, check instructions, or acknowledge an instruction. This receiver is normally in a position whereby energy transmitted from the locomotive station may be received.

Figure 4:
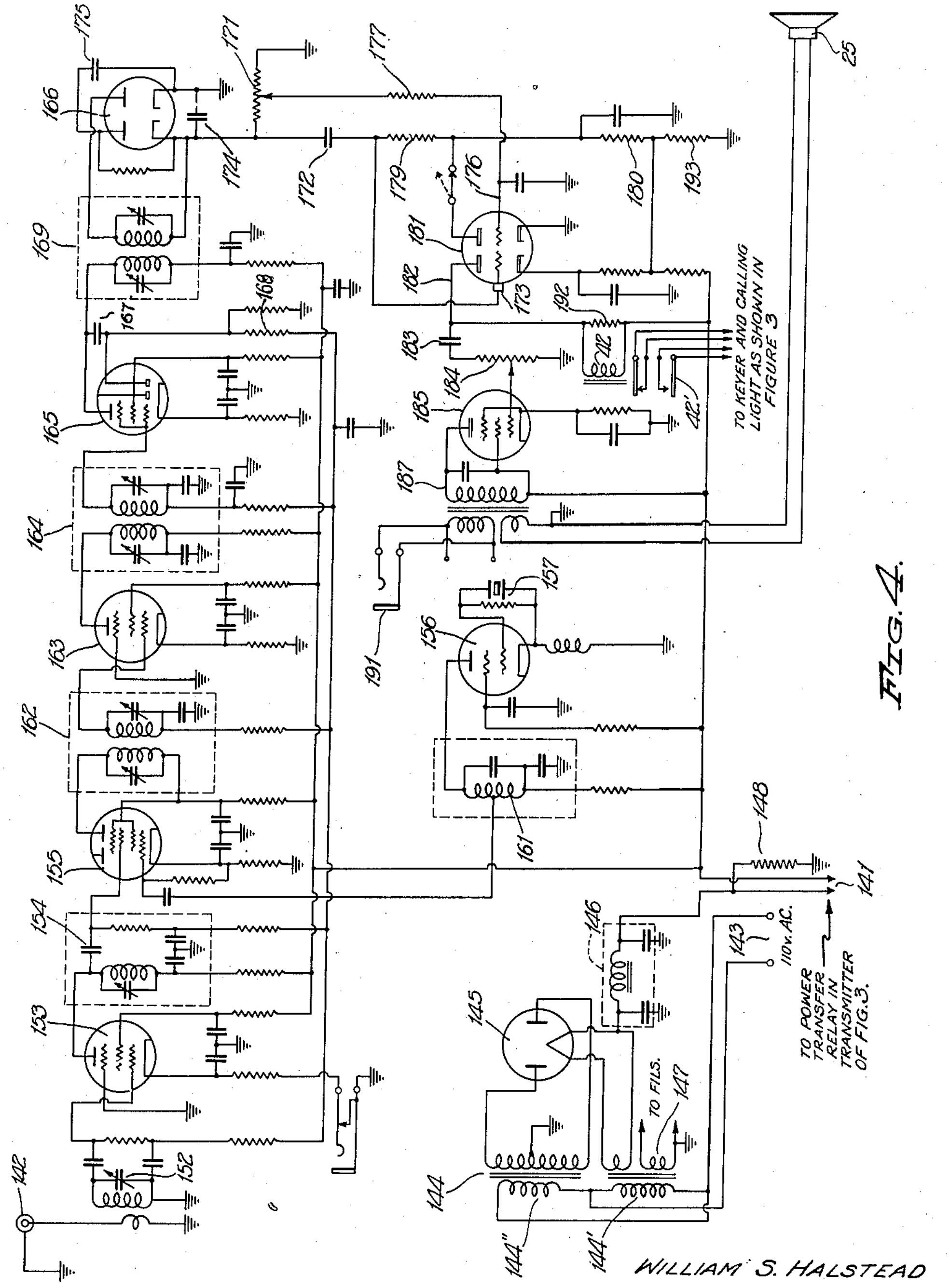
Figure 4 is a circuit diagram of a present-employed receiver utilized at the central control station.

The central station receiver illustrated in Figure 4, and in block diagram, Figure 1, is related to the central station transmitter illustrated in Figure 3 in that a common antenna may be employed in both circuits and that power for the operation thereof is sequentially applied in a predetermined periodic signalling cycle as determined by the operation of synchronous motor 81 and associated cam 82.

The power transfer relay 33 illustrated in Figure 3 is common to the receiver and to the transmitter and these are interconnected between the terminals 141. Furthermore, the common antenna 23 illustrated in Figure 3 is connected to the receiver through antenna transfer relay 24 and through a connection joined to terminals 142—142 at the receiver and transmitter.

When the power transfer relay 33 and the antenna transfer relay 24 are in the position indicated in Figure 3, the receiving circuits are energized and the antenna 23 is joined to the input circuits and thus places the receiver in a condition for the reception of signals intercepted by the antenna. The receiver may be energized from an individual rectifying circuit energized from the same source of alternating current and impressed upon the receiver terminals 143.

The plate transformer 144 and the filament transformer 147 are continuously energized from the terminating current source 143. Conventional filter section 146 is joined to the filament of the rectifier 145 for eliminating the ripple of the rectified potential. A bleeder resister 148 is shunted across the output of the filter section 146. The high potential lead for energizing the plate circuits of the various electron tubes is broken at 141 by means of normally closed contacts 33'' on the power transfer relay 33 as indicated in Figure 3. The interconnection of Figures 3 and 4 is shown by the corresponding terminals 141 on both figures.

The filaments (not shown) of the electron tubes indicated in Figure 4 are all continuously energized from the power transformer secondary 147 and thus, as shown, in Figure 4, power is applied to both anode and heater circuits of the receiver.

Incoming signals intercepted by the antenna 23 are impressed upon a radio frequency transformer 151 the secondary of which is tuned by a variable condenser 152. A radio frequency amplifier 153 of conventional form is utilized to raise the level of incoming signals and the output thereof is coupled through condenser 154 to a grid of converter tube 155.

A beat frequency oscillator tube 156 utilizing a crystal 157 for frequency control generates a continuous oscillation which is coupled from coil 161 to another grid of the converter tube 155. This radio receiving circuit may comprise the conventional superheterodyne circuit for receiving and demodulating incoming signals. Thus, the output of the converter tube 155 is coupled through an intermediate frequency transformer 162 to the control grid of an amplifier 163.

The output of this last mentioned amplifier 163 is then coupled through the intermediate frequency transformer 164 to a second amplifier tube 165. This tube has a diode section energized through condenser 167 and having a load resistor 168 which furnishes a negative biased voltage for automatic volume control as is well known in the art. The output of the amplifier tube 165 is also coupled to intermediate frequency transformer 169 to one anode 170 of the double diode rectifier tube 166. The variable potentiometer 171 acts as a diode load and is coupled through condenser 172 to the grid 173 of the dual triode 181.

The diode load 171 is by-passed by condenser 174 which acts as a radio frequency filter. This diode load 171 is also shunted by the other diode section of tube 166, and condenser 175. This acts as a noise discriminating and limiting circuit. The arm of the potentiometer 171 is connected to grid 176 of the dual triode tube 181 through the filter resistor 177. When no carrier is present the grid 176 is at zero potential with respect to its associated cathode and therefore the effective plate resistance is very low. By means of the voltage dividing network comprising resistors 180 and 193, the grid 173 through its gridleak 179 is maintained at a high negative voltage with respect to its associated cathode. This high negative bias effectively reduces the amplification of the tube to a minute value and causes a cessation in the flow of plate current. When a carrier is present and amplified by the respective radio frequency and intermediate radio frequency amplifiers and rectified by means of the diode 166, a negative voltage appears across potentiometer 171. This voltage when applied from the adjustable arm of the aforementioned potentiometer to the filter resistor 177 through the grid 176 of the dual triode 181 causes the plate resistance thereof to increase considerably in value. This by means of the aforementioned voltage dividing network causes the grid 173 to assume its normal operating bias with respect to its associated cathode. Thus, audio-frequency noise suppression is effected, under control of an incoming radio frequency carrier.

Therefore, plate current will flow through 182 and thru the relay 42' causing the switching members to operate. Since the winding of the relay 42 has a high impedance to audio-frequencies, this winding together with the compensating resistor 192 acts as the plate load for 182 and thus the audio-frequency signals are coupled by means of condenser 183 and volume control 184 to the input grid of the power amplifier tube 185.

The output of amplifier 185 is coupled through transformer 187 in the anode circuit thereof to the loud speaker 25 and to a plug 191 whereat earphones may be connected if desired.

The anode 182 is energized from the high positive potential through a parallel combination of load resistor 192 and the coil of suppressor relay 42. An incoming carrier intercepted by the antenna 23 and amplified and demodulated in the various receiver circuits illustrated in Figure 4 will thus cause the energization of the coil of relay 42 to cause the movement of switch members 42'.

This novel manner of actuating a lock-out relay 42 inserted in an audio-frequency noise suppression circuit in accordance with an incoming radio frequency carrier is illustrated in both Figures 3 and 4 and the various connections of the switching members are best illustrated in Figure 3. Thus it may be seen that the energization of the coil of relay 42 due to a received signal will cause the movement of the switch members to open the series circuit of switch 84 and contacts 81' between the coils of relays 33 and 24.

Accordingly, the continued operation of the switch 84 under the influence of the cam 82 will have no effect upon these circuits. The operation of the switch members of suppressor-actuated relay 42 also completes a circuit from the filament winding 74 of the power transformer to the call light 43 and thus when a signal is received, the calling light will flash. An incoming signal will operate lock-out relay 42 as previously described to preclude the operation of power transfer relay 33 and antenna transfer relay 24 from the positions indicated in Figure 3.

Therefore, the reception of a signal will preclude the transmission from the central station of the checking impulse or speech transmission which would normally tend to interfere with the signal received. As the antenna 23 is alternately switched from the receiver circuit to the transmitter circuit, reception will only take place when in the position shown in Figure 3. This permits the operator of a classification yard locomotive, by the mere transmission of his carrier wave, to maintain the central station in condition for receiving the signals.

The engineer may transmit speech signals from his vehicle transmitter which will be made audible through the agency of the central station loud speaker 25. Or he may by merely keying his carrier in accordance with a predetermined code, cause the calling light 43 to flash correspondingly.

When the operator of the mobile unit deenergizes his transmitter, the lock-out relay 42 automatically is deenergized and permits the switching member 42' to assume the position indicated in Figure 3, which thus permits keying of the central station carrier wave in accordance with the checking signals generated by the cam 82 and the switch 84, and speech transmission initiated by foot switch 32.

The modification of the central station circuit described in connection with Figures 3 and 4 utilizes a single antenna for the transmission and reception of signals.

It is pointed out that various known forms of transmission systems may be utilized in connection with a classification yard traffic coordination system of the nature being described. Thus the receiver and transmitter units at both the central station and the mobile station within a locomotive may be of the ultra high frequency type employing directional radiation or non-directional radiations.

This of course constitutes no limitations whatsoever since the various longer wave transmission systems may be utilized, if convenient. This will merely necessitate a modification of the modulators and amplifiers. Furthermore, the common antenna illustrated may be dispensed with and an individual antenna employed for the receiver circuit and the transmitter circuit.

If a separate antenna is employed it will eliminate the need for antenna transfer relay 24 and the circuit connections which are necessary to cause the proper energization thereof as described.

However, with an ultra-high frequency system of the illustrative type described herein, a single communications channel may be employed for both transmitter and receiver. This is preferable in the illustrative case, since it permits the employment of a single tuned antenna circuit of high efficiency for both units.

On the other hand, a distinct carrier frequency may be utilized for each station and the circuits necessary for demodulation and transmission may be varied accordingly as is well known in the art. It is also possible with the general system disclosed in connection with the central station unit illustrated in Figures 3 and 4 to utilize the technique of localized traffic lane signalling within a restricted locality disclosed in copending application Serial No. 260,644, filed March 8, 1939, now Patent No. 2,255,055; issued September 9, 1941.

As disclosed in copending application Serial No. 260,644, electric wave signalling may be effected in a localized area along a traffic lane by means of a transmission cable disposed within the area for the extent of a signalling zone.

The mobile unit to be described in connection with block diagram Figure 2 and subsequently to be described in connection with Figures 7 and 8, may of course utilize any of the aforementioned signalling channels. The receiving circuit illustrated in Figures 7 and 8 corresponds with the diagrammatically illustrated mobile receiver of Figure 2 and similar reference numerals will be carried over to designate similar elements.

This mobile station may, if used upon the classification yard locomotive, be most conveniently disposed upon the tender with connections to a microphone and a loud speaker and necessary switching equipment within the locomotive cab. The station comprises essentially a transmitter and a receiver cooperating with antenna 51 which may be of a coaxial type. During normal operating conditions the receiver is continually energized and the antenna is joined thereto in order that any signal transmitted from the central station be immediately apparent within the locomotive cabs.

Thus, as shown, through antenna transfer relay 55, the antenna 51 is coupled to the input radio frequency transformer 201 of the receiving circuit. The receiver is substantially similar to that utilized at the central station and illustrated in Figure 4.

The power required for driving the various transmitting and receiving circuits illustrated in Figures 7 and 8 is obtained from a locomotive electrical power supply which is a conventional 32 volt direct current supply. This supply is utilized to continuously energize all of the filaments of the combined circuit in accordance with circuit 202.

The variable resistor 203 is inserted in series with the filament circuit 202 and the direct current impressed upon terminals 204. To obtain the required voltage for driving the plate circuits of the various tubes, a small motor generator, employing a motor unit 205 is utilized to drive a directly-coupled generator 206 to generate the required voltage.

This voltage is filtered by the circuit of chokes and condensers 207 to remove any commutator ripple or the like. The output high direct-current potential is then selectively impressed upon the plate circuits of the receiver or the plate circuits of the transmitter as determined by the position of power transfer relay 64 which operates simultaneously with the antenna transfer relay 55. As shown, the high-direct-current potential is coupled to the anode circuits of the receiver electron tubes and the antenna 51 is coupled to the input transformer 201.

The receiver comprises essentially a radio frequency amplifier 211 energized by the potential developed within the tuned radio frequency input circuit 201. The anode of this radio frequency amplifier is energized from the high potential generated by the motor generator 205, 206 and the output thereof is coupled through circuit 212 to one grid of a converter tube 213.

A heterodyne oscillator 214 utilizes a tuned circuit 215 and a crystal 216 for determining the frequency thereof and the continuous frequency output thereof is impressed through coupling condenser 217 upon another grid of the converter 213.

The beat frequency component of the output of converter 213 is selected and coupled to the intermediate frequency amplifier 221 by an intermediate frequency transformer 222. This amplifier operates in conventional manner and the output thereof is coupled through intermediate frequency transformer 223 to the input of the diode-pentode tube 224 which in turn is coupled to the automatic volume control circuit and a demodulator and noise limiter as hereinabove described in connection with the central station receiver illustrated in Figure 4.

The demodulated output of this receiving circuit is then coupled to a double triode electron tube 226 one section of which functions to amplify the audio-signal. The other section of tube 226 acts as a suppressor circuit as described in connection with the similar circuit of Figure 4. The signal is then coupled through condenser 237 to a power amplifier 241 the output of which is coupled through transformer 242 to an earphone connection 243 and a parallel two-channel filter (illustrated in Figure 8) through the terminals 3 and 4 of the connector 244 illustrated in both Figures 7 and 8.

Referring now to Figure 8, the filter section comprises essentially a parallel arrangement of high pass and low pass filter sections joined to the terminals 3 and 4 of the connector 244. Thus a low pass filter which may in one form comprise series chokes 245 and shunt condenser 246 will effectively block the passage of high frequency signals while permitting the unimpeded passage of low frequency signals therethrough.

The high pass filter in parallel with the low pass filter section joined to terminals 3 and 4 of connector 344 comprises essentially a plurality of series condensers 247 and shunt inductance 251. This filter section then will preclude the passage of relative low frequencies while permitting the unimpeded passage of the higher frequency signals. The design of the filter will determine the extent to which attenuation of signals of various frequencies may be effected. Hence the high pass filter section may be designed to pass a relatively small amount of low frequency energy to permit limited aural reception of the checking signal, if desired.

Accordingly, demodulated energy applied to the terminals 3 and 4 from the output of the power amplifier 241 will selectively pass through filter circuits depending upon the nature of the signal. If the received signal comprises the low frequency checking impulses periodically transmitted from the central station in the manner described in connection with Figures 1, 3 and 4, then the low pass filter section will permit the passage of the demodulated currents which will then be impressed upon full wave rectifying unit 252.

This rectifier may comprise a small dry-disc bridge as indicated, and the low frequency checking signal will be rectified therein and as illustrated, the output thereof is impressed upon the coil 253 of the checking signal relay 62 illustrated also in Figure 2.

Since the current is of a fluctuating nature, although rectified, a condenser 254 is shunted across the relay coil to preclude chattering and improper operation of the relay coil 253. Thus it may be noted that the checking signal transmitted from the central station periodically due to the operation of synchronous motor 81 and correspondingly switch 84 will be received at the locomotive in the classification yard and will be demodulated and amplified and impressed upon a relay 62.

The switching member 62′ of this relay will therefore operate in a manner which corresponds with the operation of switch 84 during normal operation of the two-way signalling system. The closure of relay 62 as indicated in Figure 8 will short-circuit a section of a variable resistor 261. This resistor 261 is joined in series through terminals 1 and 2 of connector 244 indicated in Figures 7 and 8, with a checking pilot light 63 and the entire series circuit is connected between the direct current supply of the locomotive and ground.

Therefore, the checking pilot light 63 is continuously energized by the passage of current therethrough, this current being determined by the magnitude of resistor 261.

Upon the receipt of a checking signal, the contacts of checking relay 62 are closed and a section of the resistor 261 is short-circuited as determined by the position of the variable tap 263. Therefore, the checking light will flash to full brightness upon the receipt of a checking impulse and indicate in the manner described, the proper operation of the transmitting and receiving circuits. The output of the high pass filter comprising the condensers 247 and the choke 251 is coupled through transformer 264 to the loud speaker 57.

A received speech transmission will pass through the high pass filter section and energize the loud speaker and so permit the central station operator to instruct the operator of the classification engine. The speech transmission will not effectively flow through the low pass filter and thus will not energize the checking lamp.

The checking signals may, as described above, be permitted to energize the loud speaker 57 to provide an audible check on the operation of the traffic communication system. Thus the checking signals will periodically cause the flashing of the lamp and simultaneously cause a distinctive "checking" or "proceed" tone to be heard from the loud speaker.

Since the checking signals are automatically cut out at the central station, as described, when speech is being transmitted, the checking signals will not interfere audibly with this speech. The locomotive engineer is provided, by the apparatus illustrated in Figures 7 and 8, with a transmitter for calling and speaking to the central station operator. The filaments of this transmitter are normally energized from the locomotive 32 volt supply. The plate circuits thereof are normally deenergized and the antenna 51 is normally uncoupled therefrom.

When the engineer desires to call the central station, he may depress his transmitter switch 54 which, as illustrated in Figure 7, joins coil 271 of relay 272 between the direct current source available and ground. A resistor 273 reduces the flow of current in the relay winding to prevent damage to the relay coil 271.

In addition, the operation of switch 54 energizes the coil 274 of the antenna transfer and power transfer relays 55 and 64 respectively, and thus causes the consequent movement of the switch arms which in turn connects the antenna 51 to the output of the transmitting circuits and applies the high potential available from the generator 206 to the transmitting anode circuits and disconnects this potential from the receiver circuits.

The energization of relay coil 271 causes the movement of the switching members 272′ downwardly as viewed in Figure 7 to close their respective circuits and as indicated, complete one circuit from the positive terminal of the direct current available at the terminals 204 through the switching member and through a variable resistor 276 to ground.

The variable tap of the resistor 276 then is joined in circuit through the primary of the transmitter input transformer 275, through the microphone 65 to ground. Thus an energizing potential is impressed upon the microphone 65 which is preferably of the carbon type since relatively high gain is obtained immediately at the microphone.

The other switching member of the relay 272 short circuits a section of a variable resistor 281. This resistor is in series with a transmitting pilot light 66 and the series combination is joined to the terminals 204. The resistance in the transmitting pilot light circuit presented by resistor 281 is normally sufficiently great to preclude the illumination of transmitting pilot bulb 56.

However, upon the operation of relay 272 and the short circuiting of a section of the resistor 281, the lamp 66 glows to indicate that the transmitter is being energized. The transmitter may be of any conventional form and, as illustrated, essentially comprises an oscillator 282 having a tuned circuit 283 and a crystal 284 for determining the frequency thereof.

The output of the oscillator is coupled to the control grid of a power amplifier 285, the plate circuit of which is energized from the high potential source through inductance 286 and through radio frequency choke 287 and tank inductance 291. The screen grid of the power amplifier 285 is also energized from the high potential source through inductance 286 and through resistor 292.

Sound waves, when impressed upon the carbon microphone 65 establish corresponding electrical fluctuations which are impressed upon the primary of transformer 275 and cause corresponding electrical variations in the secondary thereof which is joined to the control grid of modulator tube 295.

The screen grid of the modulator 295 is joined to the high potential source and the plate circuit thereof is joined thereto through the inductance 286. The amplified signals which appear in the output circuit of the modulator 295 modulate the radio frequency carrier generated by the oscillator 282 and its associated crystal 284.

Thus when speech is impressed upon the microphone 65 and the switch 54 is closed, the antenna 51 will radiate a carrier modulated in accordance with the speech. If no speech is impressed upon the microphone, the carrier only will be radiated.

The radiated signals will be received at the receiver illustrated in Figure 4 at the central station and in the time intervening between two successive checking impulses, the radiated carrier or modulated carrier will cause the suppressor relay 48 of the central station to operate to preclude the further transmission of checking signals.

This traffic communication system may be employed wherever mobile units are operated in a localized signalling area. Where applied to railroad work and more specifically to classification yards at freight stations, the elements of the apparatus may preferably be arranged as illustrated in Figures 5, 6, 9, 10, 11 and 12.

Figure 5:
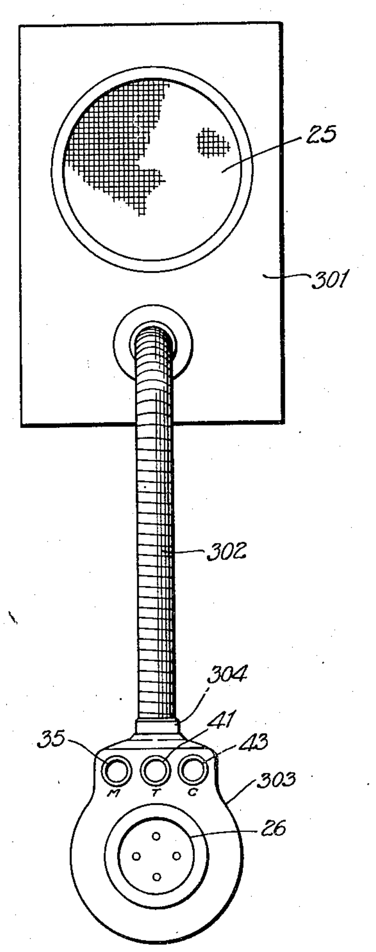
Figure 5 is a front elevational view of one preferred arrangement of a microphone, signal lights, and a loudspeaker disposed at the central control station.
Figure 6:
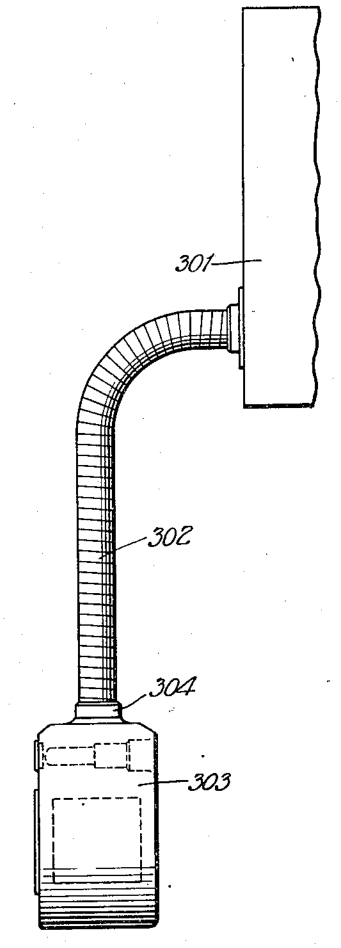
Figure 6 is a side elevational view of the apparatus shown in Figure 5.

Thus at the central control station, we may incorporate the loud speaker, microphone and indicating lights into a single compact unit as illustrated in Figures 5 and 6. The loud speaker 25 is mounted within a housing 301 in a position slightly above ear-level where sounds may most easily be detected. A flexible or non-flexible arm 302 supports the microphone 26 within a housing 303 attached to the arm at 304.

In addition, the housing also provides supporting means for the three indicating lights at the central station schematically illustrated in Figure 1 and in the circuit diagrams of Figure 3. These lights may be of a distinctive color and are energized through the necessary wiring indicated in Figure 3, this wiring being carried through the flexible arm 302.

The entire assembly of microphone, loud speaker and checking lights may be disposed at a central control point within the station which, in turn, may be located adjacent the hump of the classification yard.

If the operator is in an elevated position, with respect to the hump, in a control tower, then the microphone and loud speaker assembly indicated in Figures 5 and 6 may be disposed adjacent a window overlooking the yard. The foot switch 32 which, when depressed, permits the transmission of speech from the central station, may be disposed directly beneath the combined microphone and loud speaker assembly.

The central station operator will always have the microphone available for speech transmission and, by merely depressing the foot switch, may call a locomotive within the classification yard and relay the required instructions. Furthermore, at all times the three indicating lights, 41, 43 and 35 will be in his field of vision in order that he may ascertain the correct operation of the system.

Since the operator will always be near the microphone and loud speaker assembly, the calling of a locomotive engineer will immediately be apparent to the central station operator who will then acknowldege this call and confer with the locomotive engineer.

As indicated in Figures 9, 10 and 11, the microphone of the mobile unit may be of similar construction. Thus the microphone 65 is supported upon a flexible arm 311 which in turn is carried upon a support 312 which may be secured to the roof of the locomotive, or other vehicles, by a plurality of screws 313.

The microphone in this embodiment is mounted within a shock resistant housing in order that the vibration and the like experienced by the locomotive will not injure the sensitive microphone nor cause undue transmission of noise. Thus, as indicated in Figure 10, the microphone 65 is supported substantially centrally within a housing 314 which is joined to the flexible arm 311 at 312.

The flexible arm carries the necessary microphone wires 315 therethrough to permit the energization thereof and the transmission of speech currents. The relatively large space between the microphone and the outer wall of the supporting housing 314 is packed with a highly-resilient material 316 or the like in order that the jarring of the housing will be effectively damped and not transmitted to the microphone itself.

The indicating lights 63 and 66 at the transmitter, which visually indicate the checking signal and show that the locomotive transmitter is not in operation, may be mounted upon the microphone in order that the engineer when speaking, may have a visual indication of the condition of the various system elements. The mounting of the microphone is most clearly illustrated in Figure 12, which is a pictorial illustration of the interior of a locomotive cab.

The engineer, as is well known, normally must observe the roadway in performing the various operations and cannot conveniently employ his hands to hold a microphone. Thus, we prefer to suspend the microphone directly within the engineer's field of vision by means of the flexible arm 311, by securing the support 312 to the roof of the cab, and extending the flexible connector so that it projects inward with respect to the window 321 of the locomotive.

The directional loud speaker 57 employed within the locomotive cab may be disposed behind the engineer's seat 322 and directed towards him so that the speech signals will readily be audible. Accordingly, the engineer will receive transmitted speech signals by loud speaker 57 and will at all timues have the checking signal in his field of vision to ascertain the proper working order of the complete communication system.

The transmitting switch 54 may be disposed adjacent the sash of the window 321 in order that the engineer may conveniently operate this switch without moving from his normal position. Since the microphone, as was previously mentioned, is directly within his field of vision, he will at all times be able to observe operation of the checking or proceed signal and transmitting pilot light indicators.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a signaling system of the type described, a transmitter adapted to be under selective control of an operator and receiver, a relay transferring power alternatively to said transmitter and said receiver during the interval when said transmitter is not under control of said operator, periodic means for energizing said relay, and a monitoring signal actuated by the movement of said relay so as to indicate when power is transferred to said transmitter.

2. In a signaling system of the type described, an antenna and a receiver, shifting means periodically connecting said receiver to said antenna, a noise suppression circuit in said receiver yielding a sharp discrimination between signals below and above a predetermined energy level, and a relay connected to said noise suppression circuit and acting, upon the passage of signals through said noise suppression circuit, to suspend the operation of said periodic shifting means, whereby said receiver remains connected to said antenna during signal reception.

3. In a signaling system for effecting automatic supervisory signaling between a central station and a remote unit, wherein the central station includes a first carrier wave transmitter, carrier wave receiving means responsive to carrier wave energy from said remote unit, and wherein said remote unit includes carrier wave receiving means responsive to carrier wave energy from said central station, and a second carrier wave transmitter, the combination which comprises, a source of audio frequency control signal energy at said central station, automatic switching means for periodically effecting emission of a carrier wave by said central station transmitter and concurrently impressing said signal energy on said carrier wave, and a visual indicator disposed at said central station, a lockout relay connected to the carrier wave receiving means of said central station, and responsive to carrier wave energy received from said unit, said relay having switching means operable to prevent periodic transmission of carrier wave energy by the central station during reception of carrier wave energy from said unit, said lockout relay also having a second switching means operable to actuate said visual indicator during reception of a carrier wave from said unit, said carrier wave receiving means of said central station including a noise suppression circuit and said lockout relay being connected to said noise suppression circuit, whereby the operation of said relay is positively determined by the reception of a signal above a predetermined energy level.

WILLIAM S. HALSTEAD.

REFERENCES CITED

The following references are of record in the file of this patent:

UNITED STATES PATENTS

| Number | Name | Date |
|---|---|---|
| 1,675,889 | Kispaugh | July 3, 1928 |
| 1,735,344 | White | Nov. 12, 1929 |
| 1,767,749 | Fisher et al. | June 24, 1930 |
| 1,877,571 | Forbes | Sept. 13, 1932 |
| 1,897,237 | Carter et al. | Feb. 14, 1933 |
| 1,900,082 | Wallace | Mar. 7, 1933 |
| 1,940,881 | Ports | Dec. 26, 1933 |
| 1,973,298 | Sloggett et al. | Sept. 11, 1934 |
| 2,032,725 | Sorensen | Mar. 3, 1936 |
| 2,061,699 | Fox | Nov. 24, 1936 |
| 2,064,639 | Whitelock et al. | Dec. 15, 1936 |
| 2,101,668 | Bishop | Dec. 7, 1937 |
| 2,165,062 | MacKay | July 4, 1939 |
| 2,165,063 | MacKay | July 4, 1939 |
| 2,223,049 | Reichle | Nov. 26, 1940 |
| 2,265,056 | Bowers | Dec. 2, 1941 |
| 2,280,421 | Chappell et al. | Apr. 21, 1942 |
| 2,289,794 | Martin | July 14, 1942 |
| 2,381,754 | Jadraque et al. | Aug. 7, 1945 |
| 2,386,844 | Davis | Oct. 16, 1945 |
| 2,399,738 | Howe | May 7, 1946 |
| 2,407,846 | O'Brien | Sept. 17, 1946 |
| 2,408,878 | Preston | Oct. 8, 1946 |
| 2,412,991 | Labin | Dec. 24, 1946 |
| 2,417,136 | Smith | Mar. 11, 1947 |
| 2,421,081 | O'Brien | May 27, 1947 |
| 2,433,281 | Lord | Dec. 23, 1947 |
| 2,435,010 | Knapp et al. | Jan. 27, 1948 |
| 2,459,105 | Halstead | Jan. 11, 1949 |

FOREIGN PATENTS

| Number | Country | Date |
|---|---|---|
| 372,750 | Great Britain | May 5, 1932 |